F. W. SWANSON.
COMBINATION TRUCK AND WAGON DUMP.
APPLICATION FILED OCT. 28, 1919.
1,338,798.
Patented May 4, 1920.
2 SHEETS—SHEET 1.
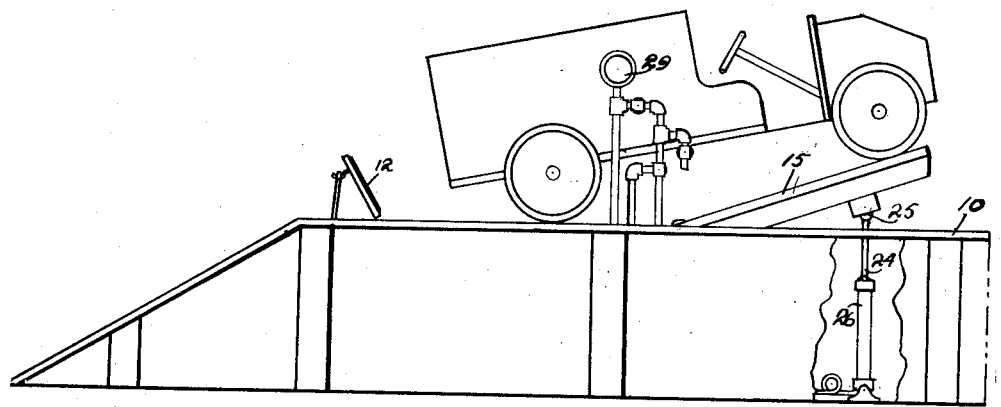
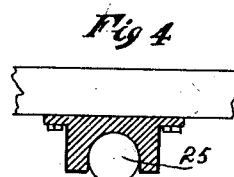
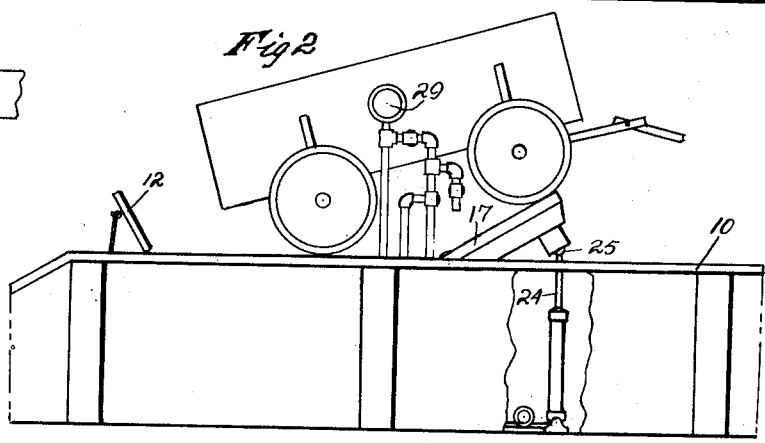
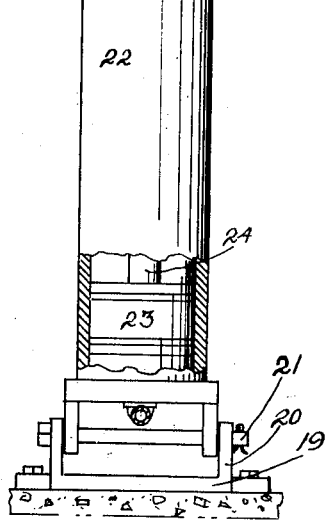
INVENTOR
Fred W. Swanson
By Orwig & Bair Atty's.

F. W. SWANSON.
COMBINATION TRUCK AND WAGON DUMP.
APPLICATION FILED OCT. 28, 1919.
1,338,798.
Patented May 4, 1920.
2 SHEETS—SHEET 2.
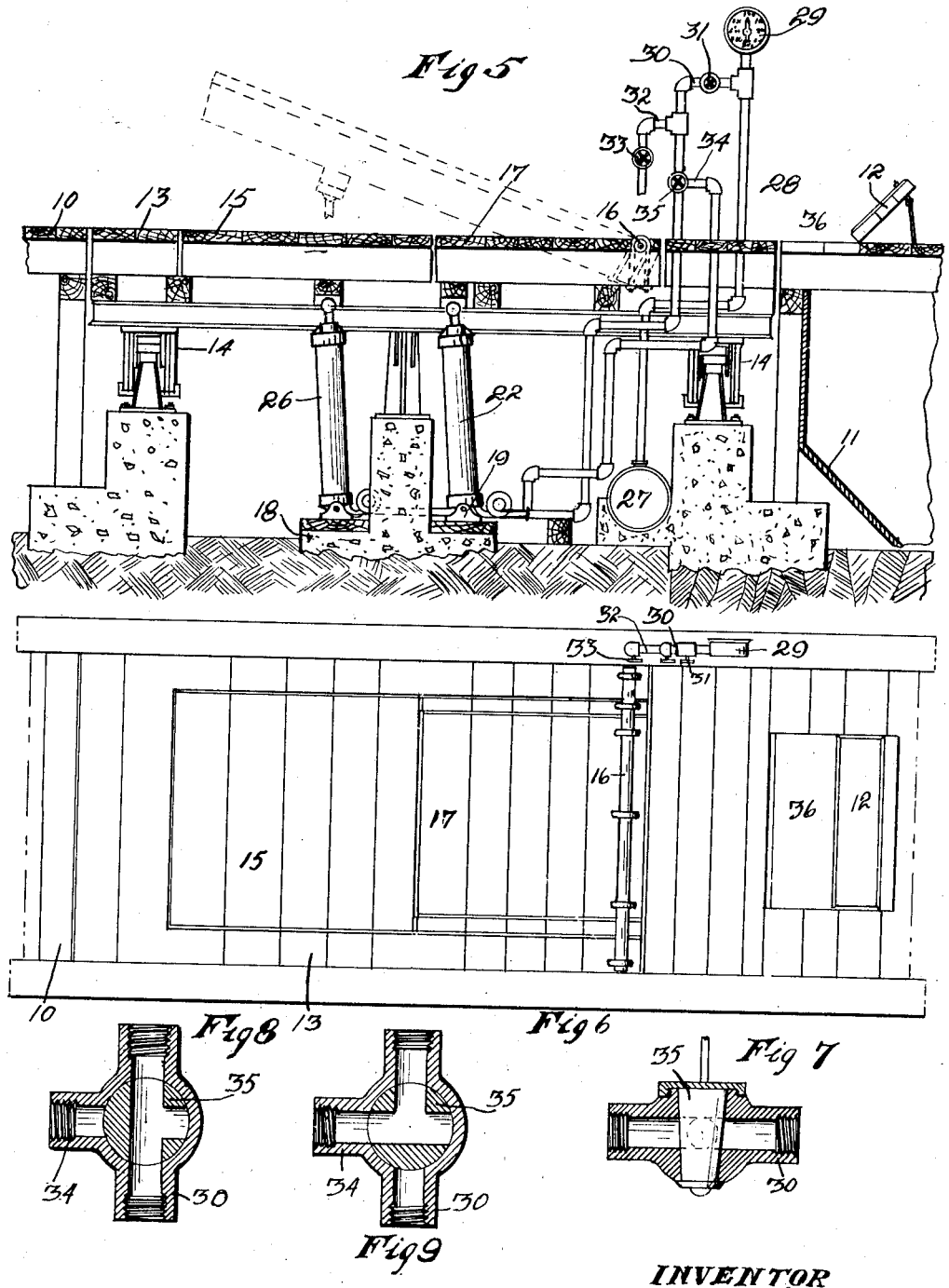

//UNITED STATES PATENT OFFICE.

FRED W. SWANSON, OF DES MOINES, IOWA.

COMBINATION TRUCK AND WAGON DUMP.

1,338,798.  Specification of Letters Patent.  Patented May 4, 1920.

Application filed October 28, 1919. Serial No. 334,056.

*To all whom it may concern:*

Be it known that I, FRED W. SWANSON, a citizen of the United States, and a resident of Des Moines, in the county of Polk and State of Iowa, have invented a certain new and useful Combination Truck and Wagon Dump, of which the following is a specification.

The object of my invention is to provide a dump adapted for use in raising the front end of a vehicle such as a wagon or truck for discharging the contents from the bed thereof.

More particularly it is my object to provide a relatively long platform, and a relative short platform arranged within the outline of the first platform, said platforms having a common hinge line and to provide in connection therewith, an air pressure cylinder for each platform for raising the platforms, which cylinders may be selectively connected with a source of air under pressure from a position above the platform.

With these and other objects in view my invention consists in the construction, arrangement and combination of the various parts of the device, whereby the objects contemplated are attained, as hereinafter more fully set forth, pointed out in my claim and illustrated in the accompanying drawings, in which:

Figure 1 shows a side elevation of my improved combination truck and wagon dump showing the truck dump in raised position.

Fig. 2 shows a similar view showing the wagon dump in raised position.

Fig. 3 shows a detail view of one of the cylinders, said cylinder being shown in dotted lines in an adjusted position.

Fig. 4 shows a detail view partly in section of one of the cylinders illustrating the mounting thereof.

Fig. 5 shows a longitudinal, vertical, sectional view through my improved dump.

Fig. 6 shows a top or plan view of the dump.

Fig. 7 shows a detail, sectional view of the three-way valve.

Figs. 8 and 9 show sectional views of said valve in different positions of its adjustment, taken at right-angles to the view shown in Fig. 7.

In the accompanying drawings I have used the reference numeral 10 to indicate generally the floor in a grain elevator or the like.

Below a certain portion of the floor 10 is a grain receiving bin 11. The floor 11 is provided with a door 12 which permits access through the floor to the grain bin.

In the floor 10 is a scales platform 13 mounted on suitable scale mechanism 14. Forming part of the scales platform 13 is a relatively long dumping platform 15 hinged on the rod or shaft 16.

Cut out of the dumping platform 15 and forming part thereof and being substantially shorter than the platform 15 is a wagon dumping platform 17 also hinged to the shaft 16.

The raisable ends of the dumping platforms 16 and 17, when in their lowered positions, are supported by parts of the scales platform frame.

Substantially below the dumping platforms 17 and 15 is a suitable foundation 18. Resting upon one portion of the foundation 18 is a base member 19 having spaced opposite upwardly extending ears 20 in which is mounted a bolt 21.

Mounted on the bolt 21 is the lower end of a compressed air cylinder 22 in which is the piston 23 having the piston rod 24 which projects upwardly from the cylinder.

The bolt 21 extends transversely with relation to the wagon dump platform 17 so as to permit the upper end of the compressed air cylinder 22 to swing forwardly and rearwardly.

The upper end of the piston rod 24 is connected with the under surface of the wagon dump platform 17 near the forward end thereof by a ball and socket joint 25.

Similarly supported forwardly with relation to the compressed air cylinder 22 is a similar cylinder 26 similarly mounted and similarly connected with the platform 15.

Suitably located and supported is a compressed air tank 27 from which there leads upwardly an air supply pipe 28 with which is connected a pressure gage 29.

Leading from the air supply pipe 28 is a pipe 30 which extends to and is connected with the compressed air cylinder 22.

In the pipe 30 is a controlling valve 31.

Communicating with the pipe 30 between the valve 31 and the compressed air cylinder 22 is a discharge pipe 32 in which is a controlling valve 33.

Communicating with the pipe 30 between the discharge pipe 32 and the tank 22 is a pipe 34 which leads to the compressed air cylinder 26.

At the junction between the pipes 30 and 34 there is arranged a three-way valve 35 shown in Figs. 7, 8 and 9.

The three-way valve is so arranged that in one of its positions, as shown in Fig. 7, the passages to the pipe 34 and to the lower part of the pipe 30 are closed.

When the valve is rotated to its position shown in Fig. 9 air can flow from the upper part of the pipe 30 into the pipe 34, but cannot flow into the lower part of the pipe 30 past the valve 35.

When the valve is turned to another of its positions, illustrated in Fig. 8, air may flow from the upper to the lower part of the pipe 30 through the valve, but no air can flow into the pipe 34.

In the practical operation of my improved combination truck and wagon dump, it will be seen that if the wagon be driven on the scales platform, and weighed, and it is then desirable to discharge the contents of the wagon by tilting the front end of the wagon, the front wheels are moved to position on the wagon dump platform 17, and the operator then opens the valve 31 and turns the valve 35 to the position shown in Fig. 8 for supplying compressed air to the cylinder 22 for raising the forward end of such cylinder, as illustrated in Fig. 2.

After the contents of the wagon have been discharged through the opening 36, the operator closes the valve 31, and opens the valve 33 for permitting the air to escape from the cylinder 22 and the lower part of the pipe 30.

For raising the truck dump platform 15 for unloading a truck, the valves 33 and 35 are closed, the valve 31 is opened, and the valve 35 is then opened to the position shown in Fig. 9 for permitting compressed air to pass from the upper part of the pipe 30 to the pipe 34 and thence to the compressed air cylinder 26.

The platform 15 is lowered by opening the valve 33.

The simplicity and effectiveness of a structure such as that here shown are obvious from the foregoing description. It will be noted that I have effected a considerable saving in parts by connecting both the compressed air cylinders with a single source of air supply through a common pipe, and the arrangement of the valves 31, 33 and 35 is such as to make it possible to use a minimum number of valves for operating both air cylinders.

One dump will not serve for both wagon and truck for the reason that a dump that is long enough for a truck is too long for a wagon. The rear end of the vehicle must be near the opening which receives the grain, and when the rear end of a wagon is properly located, the team will be standing on the front end of the dump, which, therefore, cannot be operated.

Some changes may be made in the construction and arrangement of the parts of my improved device without departing from the essential features and purposes of my invention, and it is my intention to cover by my claim any modified forms of structure or use of mechanical equivalents which may be included within their scope.

I claim as my invention:

A combination truck and wagon dump comprising a supporting frame including a floor, a relatively long truck platform pivoted at one end within the outline of said floor, a relatively short platform pivoted at one end in said floor within the outline of said first platform, a compressed air cylinder pivotally supported below each platform for swinging movement in one plane, having a piston and a piston rod, a pivot joint for connecting the respective piston rods with the respective platforms, a compressed air tank, a pipe leading therefrom, a second pipe leading from said first pipe to one of said cylinders, a controlling valve therein, a third pipe leading from said second pipe between said valve and the first cylinder to the other of said cylinders, a three-way valve at the junction between said second and third pipes, adapted in one position to close the passage through the second pipe and the passage into the third pipe, and in another position to permit air to pass through the second pipe and when in another position to permit air to pass from the second pipe into the third pipe, a discharge pipe communicating with the second pipe between said first two valves, and a controlling valve in the discharge pipe.

Des Moines, Iowa, September 23, 1919.

FRED W. SWANSON.